Dec. 1, 1931.　　　　K. E. LYMAN　　　　1,834,530
BRAKE APPLYING MEANS
Filed June 20, 1927
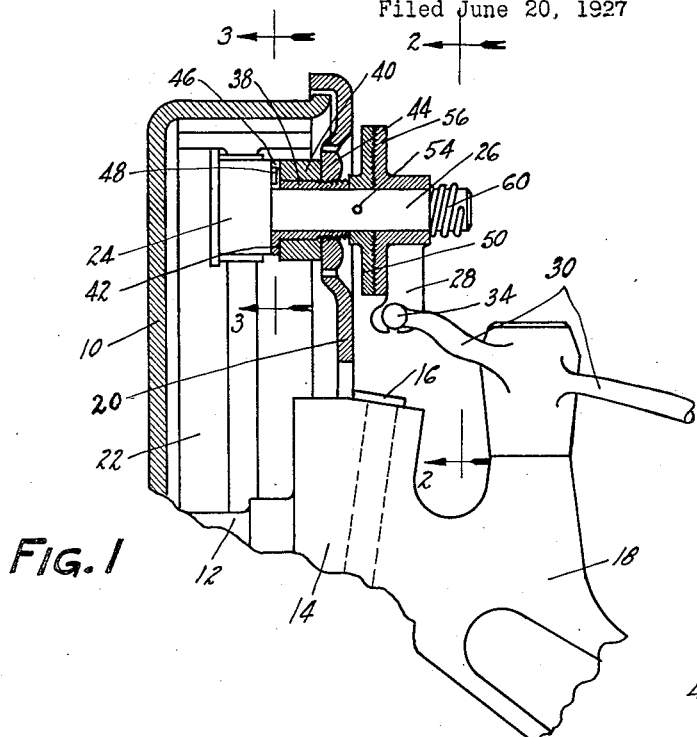
FIG. 1
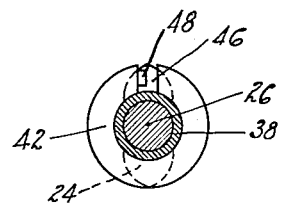
FIG. 3
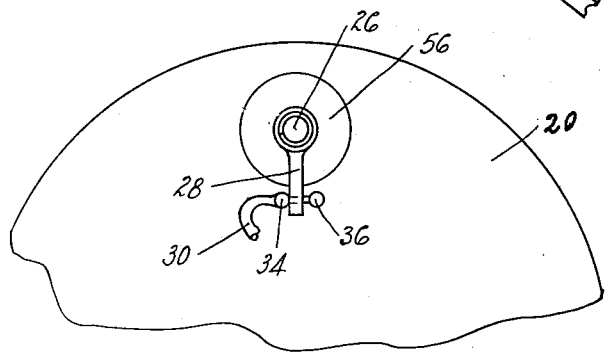
FIG. 2
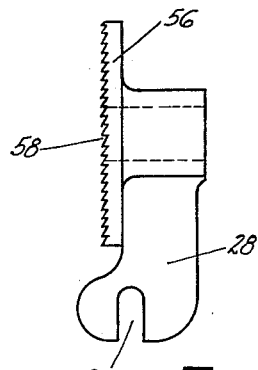
FIG. 4
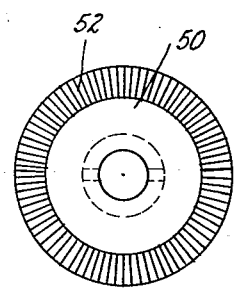 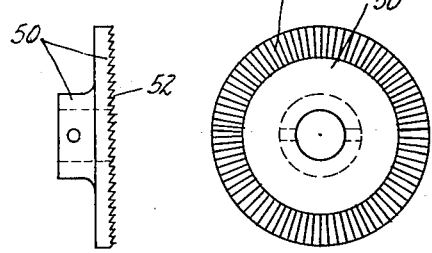
FIG. 5　　FIG. 6
INVENTOR
KENNETH E. LYMAN
BY
M. W. McConkey
ATTORNEY Patented Dec. 1, 1931

1,834,530

UNITED STATES PATENT OFFICE

KENNETH E. LYMAN, OF CHICAGO, ILLINOIS, ASSIGNOR TO BENDIX BRAKE COMPANY, OF CHICAGO, ILLINOIS, A CORPORATION OF ILLINOIS

BRAKE APPLYING MEANS

Application filed June 20, 1927. Serial No. 199,982.

This invention relates to brakes, and is illustrated as embodied in novel operating mechanism for an internal expanding brake for the front wheel of an automobile, although various features of the invention are of general utility in brakes of other types.

Most of the features of novelty relate to the adjustment of the operating mechanism to compensate for the wear of the brake. These features include a novel positioning member, such as a sleeve forming a bearing for the camshaft, and which has a flange formed with an opening for a lug on the cam or other applying device operated in such a manner as to shift the sleeve from time to time; also a novel ratchet mechanism or adjustment for operating the camshaft or its equivalent; and an improved arrangement of operating levers of such a type that the one lever operates the other positively both in its applying direction and in its releasing direction.

The above and other objects and features of the invention, including various novel combinations of parts and desirable particular constructions, will be apparent from the following description of the illustrative embodiment shown in the accompanying drawings, in which:

Figure 1 is a vertical transverse section through the upper part of the left front brake, and through associated parts, looking toward the front of the car;

Figure 2 is a partial elevation, looking in the direction of the arrows 2—2 in Figure 1;

Figure 3 is a section through part of the operating mechanism, on the line 3—3 of Figure 1;

Figure 4 is a rear elevation of one of the operating levers and a ratchet member carried thereby;

Figure 5 is a rear elevation of the other ratchet member; and

Figure 6 is an elevation of the toothed side of the ratchet member shown in Figure 5.

The brake selected for illustration includes a drum 10 rotating with the wheel (not shown). The wheel is mounted in the usual manner on the spindle 12 of a knuckle 14 swivelled, by a king-pin 16 or the like, at one end of the axle 18. A backing plate 20 may be secured to the knuckle 14 at the open side of the brake drum.

The friction means of the brake, shown as internal shoes 22, is operated by means such as a cam 24 secured to or integral with a cam-shaft 26 extending through an opening in the backing plate. The shaft 26 is rocked to apply the brake by a novel lever or crank-arm 28, which is mounted on shaft 26 and which therefore swivels with the wheel, and which is operated by a generally-horizontal lever 30 fulcrumed between its ends on the axle 18.

Lever 28 is preferably formed with a slot or opening 32 for the passage of a portion of lever 30 connecting two integral balls 34 and 36 engaging opposite sides of lever 28 and operating lever 28 positively both in applying and releasing directions. When the brake is applied, the center of ball 34 should be in or immediately adjacent the axis of the king-pin 16,—i. e. the swivelling axis of the wheel.

Shaft 26 is journalled in a bearing formed by a drawn sleeve 38, carried by a supporting bracket 40 bolted to the backing plate 14 and having at the cam end a radial flange 42 drawn frictionally against bracket 40 by a nut 44 threaded on the other end of the sleeve. Flange 42 is formed with a notch or opening 46 for a lug 48 on cam 24. Opening 46 is slightly wider than lug 48, to allow a predetermined applying movement to cam 24 without disturbing the setting of the sleeve 38. When the brake wears, lug 48 engages the side of opening 46 in applying the brake, shifting sleeve 38 enough to compensate for the wear. Then when the brake is released again, lug 48 engages the opposite side of opening 46 after a predetermined angular releasing movement, thus holding cam 24 partly turned toward applied position, so that the clearance between shoes 22 and drum 10 is the same as it was initially.

An adjusting member 50, having a flange with ratchet teeth 52 on its flat face, is secured to shaft 26 by a pin or key 54. A cooperating adjusting member 56, shown integral with lever 28, is also formed with a flange having ratchet teeth 58 on its flat face and normally interlocked with teeth 52.

A combination torsion and compression spring 60, secured at one end to member 56 and at its other end to shaft 26, urges members 50 and 56 together, and also urges member 56 angularly with respect to member 50 in a direction to take up for the wear of the brake.

When the brake has worn far enough so that sleeve 38 has been shifted an angular distance equivalent to one of the ratchet teeth, member 56 will automatically slip back one tooth on member 50 the next time the brake is released, thus preserving the relationship initially existing between ball 34 and the swivelling axis of the wheel. The ball 36 aids spring 60 in shifting member 56 in making this adjustment.

While one illustrative embodiment has been described in detail, it is not my intention to limit the scope of the invention to that particular embodiment, or otherwise than by the terms of the appended claims.

I claim:

1. Brake-applying means comprising, in combination, an operating shaft having a cam formed with a projecting lug, and a sleeve surrounding the shaft and formed with a flange adjacent the cam having an opening receiving said lug.

2. An adjusting device including a sleeve having at one end a radial flange formed with an opening transversely disposed to the axis of the sleeve.

3. An adjusting device including a sleeve having at one end a radial flange formed with an opening, the opposite end of the sleeve being threaded.

4. Applying means for a brake on a swivelled wheel comprising, in combination, a lever arranged to apply the brake and which swivels with the wheel and which is formed with an opening, and an operating lever not swivelling with the wheel and which has parts engageable with opposite sides of the swivelling lever and a portion extending through said opening and connecting said parts, one of said parts being substantially at the swivelling axis of the wheel when the brake is applied.

5. Applying means for a brake comprising, in combination, a lever arranged to apply the brake and which is formed with an opening, and an operating lever which has parts engageable with opposite sides of the first lever and a portion extending through said opening and connecting said parts.

6. Brake-applying means comprising, in combination, a brake-applying shaft, two cooperating ratchet members both mounted on the shaft one of which is shiftable axially of the shaft, a spring urging said members into interlocking engagement, a flange on the shiftable member having an opening transversely disposed to the axis of the shaft and means engaging the opening for automatically shifting one of said members with respect to the other to adjust for wear of the brake.

7. Brake-applying means comprising, in combination, a brake-applying shaft, an operating device therefor, ratchet members for adjusting said device with respect to the shaft, and a combination torsion and compression spring urging said members into interlocking engagement and also urging one member angularly with respect to the other to adjust the brake.

8. Brake-applying means comprising ratchet members for adjusting the brake, in combination with a combination torsion and compression spring urging said members into interlocking engagement and also urging one member angularly with respect to the other to adjust the brake.

9. Brake-applying means comprising, in combination, a brake-applying shaft, a member secured to said shaft having a flat radial face formed with ratchet teeth, a second member loose on the shaft having a corresponding face formed with teeth interlocking with the teeth of the first member and a radial flange on the second member having an opening transversely disposed to the axis of the shaft.

In testimony whereof, I have hereunto signed my name.

KENNETH E. LYMAN.